United States Patent
Chen

(10) Patent No.: US 7,908,938 B2
(45) Date of Patent: Mar. 22, 2011

(54) BALL SCREW MODULE

(75) Inventor: Yan-Yu Chen, Taichung (TW)

(73) Assignee: Hiwin Technologies Corp, Taichung (TW)

( * ) Notice: Subject to any disclaimer, the term of this patent is extended or adjusted under 35 U.S.C. 154(b) by 275 days.

(21) Appl. No.: 12/263,533

(22) Filed: Nov. 3, 2008

(65) Prior Publication Data

US 2010/0050802 A1 Mar. 4, 2010

(30) Foreign Application Priority Data

Aug. 29, 2008 (TW) ................................ 97133031 A

(51) Int. Cl.
*F16H 1/24* (2006.01)
(52) U.S. Cl. .................................................. 74/424.82
(58) Field of Classification Search ............... 74/424.81, 74/424.82, 424.83, 424.84, 424.86, 424.87
See application file for complete search history.

(56) References Cited

U.S. PATENT DOCUMENTS

| | | | |
|---|---|---|---|
| 5,993,064 A | | 11/1999 | Teramachi et al. |
| 6,070,479 A | * | 6/2000 | Shirai ........................ 74/424.88 |
| 6,282,971 B1 | | 9/2001 | Shirai et al. |
| 7,523,681 B2 | * | 4/2009 | Pan et al. ................... 74/424.82 |
| 2005/0235766 A1 | * | 10/2005 | Ohkubo ...................... 74/424.82 |
| 2008/0110285 A1 | * | 5/2008 | Pan et al. ................... 74/424.86 |

FOREIGN PATENT DOCUMENTS

| | | |
|---|---|---|
| DE | 69735548 T2 | 8/2006 |
| DE | 102005007875 A1 | 8/2006 |
| JP | 2001099258 A | 4/2001 |
| JP | 2001-99258 | 10/2001 |

* cited by examiner

*Primary Examiner* — Vicky A Johnson
(74) *Attorney, Agent, or Firm* — Ming Chow; Sinorica, LLC

(57) ABSTRACT

Provided is a ball screw module including a screw shaft, a nut member, a ball connector, and a circulating device inside the nut member. The screw shaft and the nut member constitute a first load rolling groove. The circulating device, being connected with the first load rolling groove, has a first turning section and a second turning section, and includes a first guiding groove and a second guiding groove. The first guiding groove has a radius of curvature greater than that of the second guiding groove when the ball connector passes the first turning section. The first guiding groove has the radius of curvature smaller than that of the second guiding groove when the ball connector passes the second turning section.

15 Claims, 8 Drawing Sheets

BALL SCREW MODULE

BACKGROUND OF THE INVENTION

1. Field of the Invention

The present invention relates to ball screw modules, and more particularly, to a ball screw module having a ball connector.

2. Description of the Prior Art

The operating principles of a conventional ball screw shaft involve providing balls between a screw shaft and a nut member so as to replace the sliding friction transmission of an outdated acme screw shaft (ACME) with ball rolling motion, thereby reducing friction-induced wear and tear greatly and maintaining high efficiency and high preciseness.

Balls are effective in enabling a screw shaft to move smoothly. However, adjacent balls are, in the course of rolling, likely to collide with each other and therefore make much noise. The collision shortens the service life of the balls and therefore shortens the service life of the screw shaft.

To solve the problems, the prior art disclosed a connector whereby balls are fixed in position. U.S. Pat. No. 5,993,064, further provides an improved ball connector made of resilient material and comprising four belt members for fixing a plurality of balls in position in four sides, and a ball connector capable of bending freely in all directions and still keeping the respective positions of the balls unchanged, such that the ball connector is applicable to linear sliding and ball screw shafts.

However, a ball screw module requires a circulating route for guiding the balls returning to a spiral-shaped groove so as to travel along a continuous ball track. A ball connector passing the circulating route has to change its direction of movement so as for the ball connector to follow a loop. An improperly designed circulating route is likely to prevent a ball connector from passing a circulating route smoothly and changing direction. Ball connectors disclosed in the prior art tend to sever when twisted and pulled unduly. Referring to FIG. 1, U.S. Pat. No. 5,993,064 taught a ball connector for use of a screw shaft, and taught a nut member having a circulating device disposed therein so as to enable the ball connector to go through a loop. U.S. Pat. No. 5,993,064, failed to teach how to enable the ball connector to pass the circulating device smoothly. In practice, the two lateral sides of a ball connector undergo 3D revolutions while traveling from a spiral track to a circulating device. If angles of a revolving route are not specially designed, a ball connector traveling along the revolving route is likely to have its inner side squeezed and its outer side pulled and therefore severed due to the different strain between its inner and outer sides in deformation. Although linear rolling tracks using ball connectors are commercially available, ball screw shafts adopting ball connectors remain unavailable in terms of design and fabrication.

SUMMARY OF THE INVENTION

To solve the aforesaid problems, it is the primary objective of the present invention to provide a ball screw module comprising a ball connector revolving smoothly in a nut member so as to achieve high performance and high preciseness of the ball screw module.

Another objective of the present invention is to provide a ball screw module comprising a nut member, and a circulating device mounted on the nut member and configured to move a ball connector along a continuous circulating route.

Yet another objective of the present invention is to provide a ball screw module comprising a circulating device having two guiding grooves configured to guide a ball connector through a course of movement and specially designed with regard to turning sections of a circulating route, allowing the ball connector to pass the turning sections smoothly without being pushed or dragged unduly.

A ball screw module of the present invention essentially comprises a screw shaft, a nut member, a ball connector, and a circulating device. The screw shaft has an outer surface provided with a spiral-shaped first load rolling groove. The nut member is circumferentially disposed around the screw shaft and has an inner surface provided with a spiral-shaped second load rolling groove corresponding in position to the first load rolling groove. The first and second load rolling grooves together form a spiral-shaped first rolling track. The ball connector moves around in the first rolling track. The ball connector comprises a plurality of balls and a connector for carrying the balls. The connector further comprises a plurality of intervals, a first linking strap, and a second linking strap. The balls are fixed in position and spaced apart by the intervals. The intervals are connected in series by the first linking strap and the second linking strap. The intervals, the first linking strap, and the second linking strap are spaced apart by a distance so as for the balls to be disposed between the intervals, the first linking strap, and the second linking strap. The cross-sectional radius of the first load rolling groove is substantially equal to the radii of the balls. To protect the first linking strap and the second linking strap of the ball connector in motion against damage, both a first teeth part of the screw shaft and a second teeth part of the nut member have surface roughness Rmax of less than 25 μm. The circulating device is provided to the nut member and formed with a circulating route in communication with the first rolling track, so as to enable the ball connector to pass the circulating route. The circulating route has a cross-sectional radius substantially equal to the first rolling track. To guide the ball connector through a course of movement, the circulating route is provided with a first turning section, a second turning section, a first guiding groove, and a second guiding groove. The first guiding groove is provided beside the circulating route to enable the first linking strap of the ball connector to pass the first guiding groove. The first guiding groove has a first radius of curvature. The second guiding groove is provided on the other side of the circulating route and spaced apart from the first guiding groove by a fixed distance, so as to enable the second linking strap of the ball connector to pass the second guiding groove. The second guiding groove has a second radius of curvature. The ball connector takes a turn at the first turning section and the second turning section in a three-dimensional manner for the reason as follows. The first radius of curvature of the first guiding groove is greater than the second radius of curvature of the second guiding groove when the ball connector passes the first turning section. The first radius of curvature of the first guiding groove is less than the second radius of curvature of the second guiding groove when the ball connector passes the second turning section. The first guiding groove and the second guiding groove are substantially equal in length. Hence, in response to variation in curvature of the guiding grooves, the first linking strap and the second linking strap turn in a three-dimensional manner while passing the guiding grooves.

Compared with the prior art, the ball screw module of the present invention has the following advantages: a circulating device of the ball screw module of the present invention has two guiding grooves specially designed in terms of radii of curvature with regard to turning sections, and thus at the turning sections in the circulating device the ball connector is guided through a three-dimensional turn along a specific path; and the two guiding grooves are substantially equal in length such that a first linking strap and a second linking strap of the ball connector are not unduly dragged or pushed when passing the turning sections.

BRIEF DESCRIPTION OF THE DRAWINGS

The invention as well as a preferred mode of use, further objectives and advantages thereof, will best be understood by reference to the following detailed description of illustrative embodiments when read in conjunction with the accompanying drawings, wherein.

DETAILED DESCRIPTION OF THE EMBODIMENTS

Figure 1:
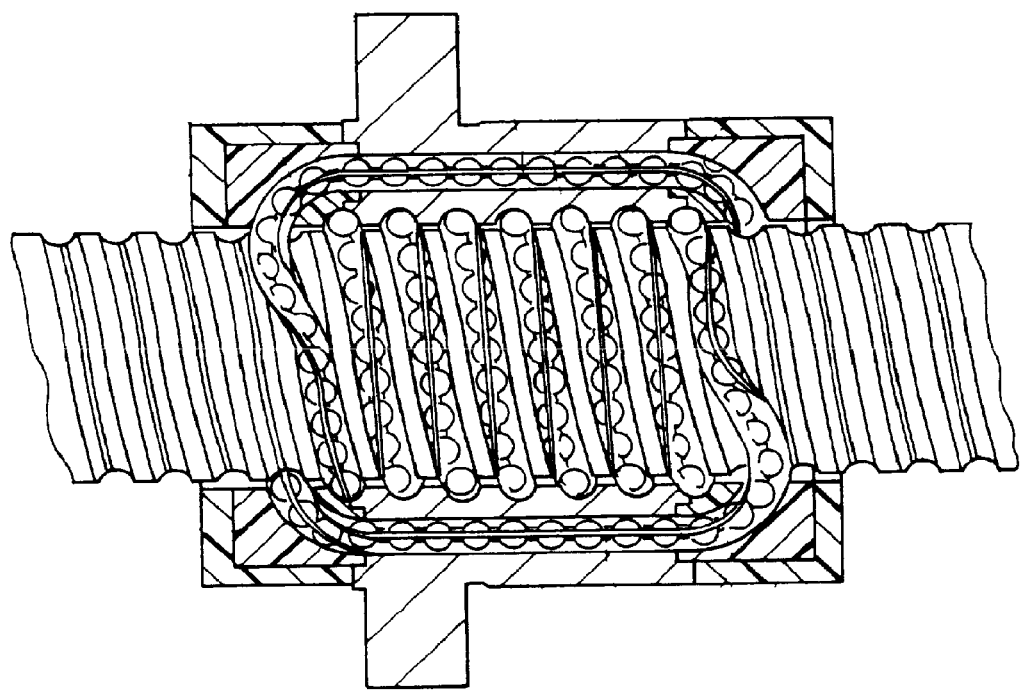
FIG. 1 is a cross-sectional view of a ball screw module and a ball connector thereof according to the prior art.
Figure 2:
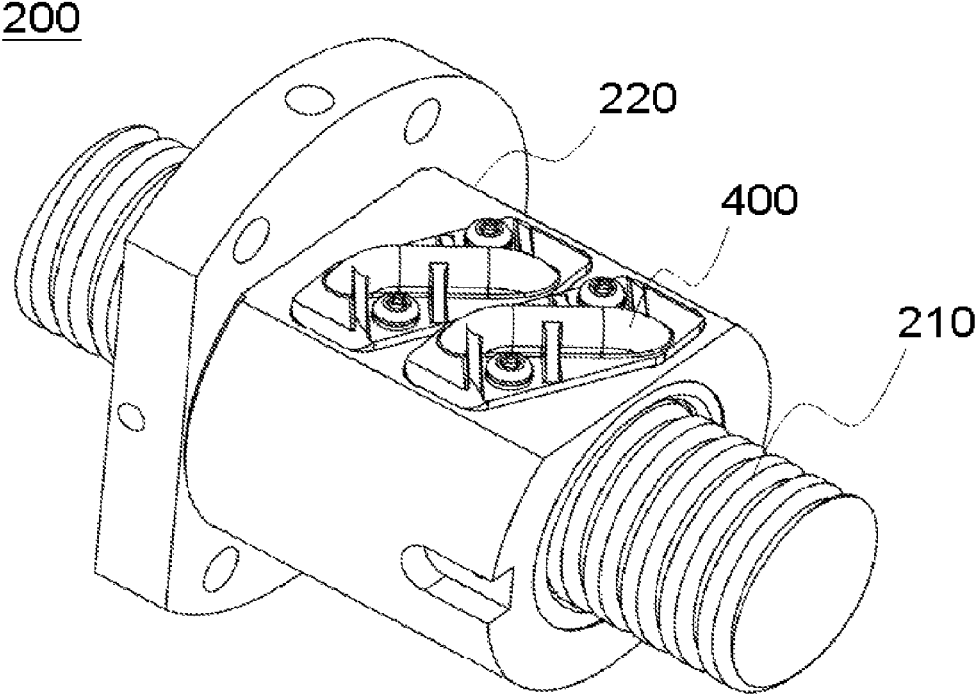
FIG. 2 is a perspective view of a nut member and a screw shaft of the ball screw module according to the present invention.
Figure 3:
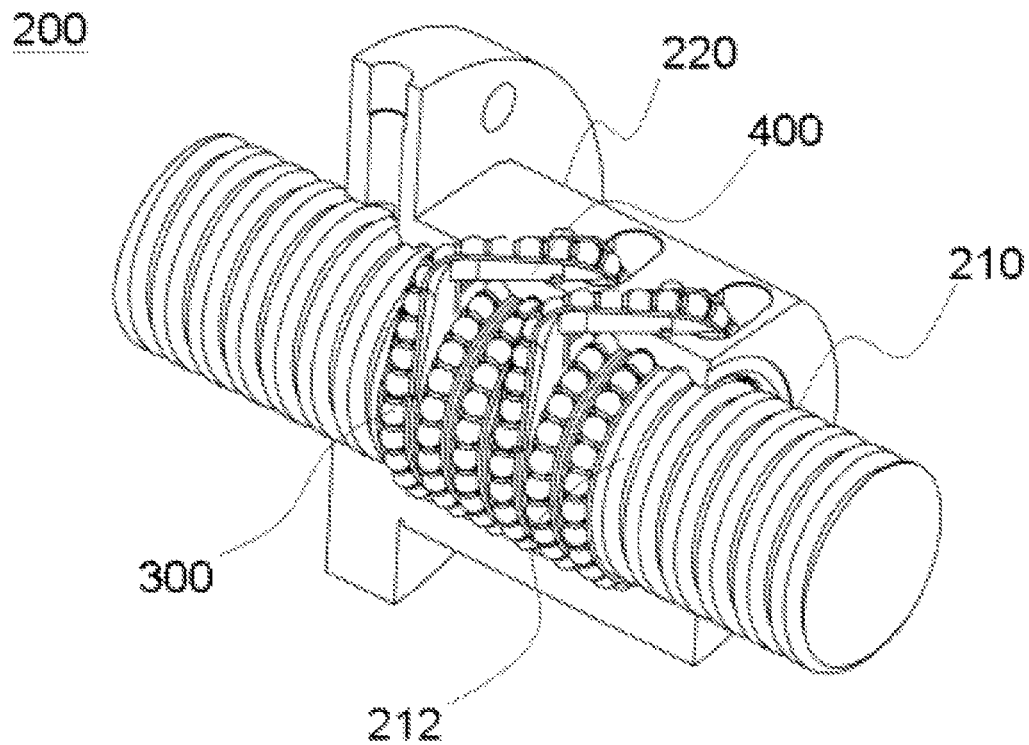
FIG. 3 is a schematic drawing showing a ball connector and a circulating device of the ball screw module according to the present invention.
Figure 4:
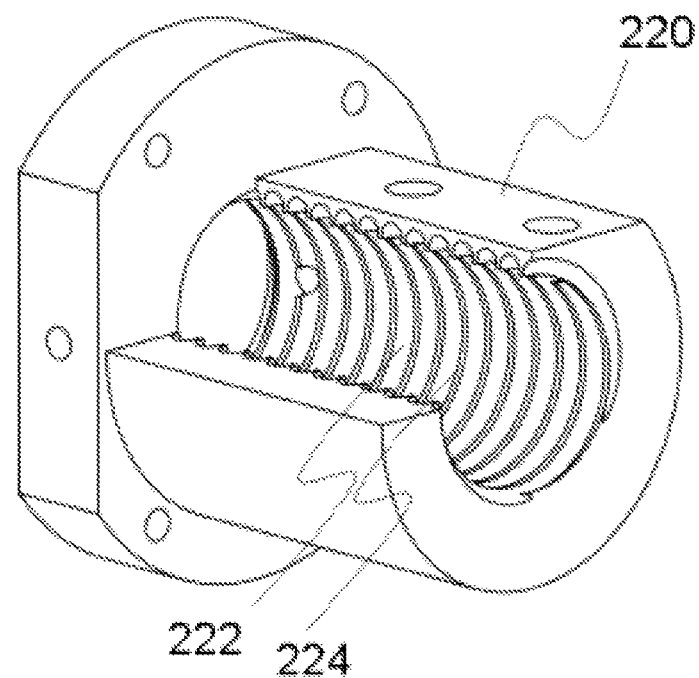
FIG. 4 is a schematic drawing showing a second teeth part and a second load rolling groove on the inner surface of the nut member of the ball screw module according to the present invention.
Figure 5:
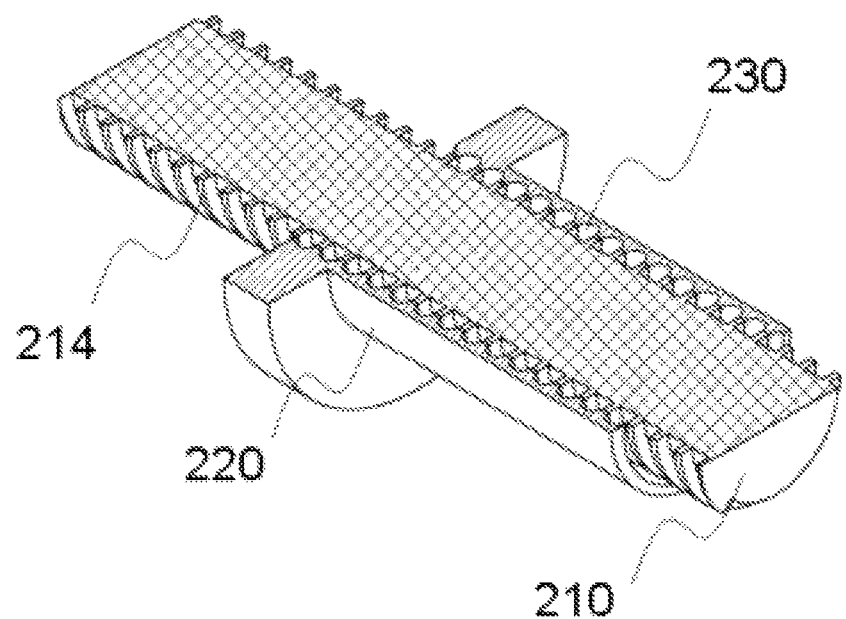
FIG. 5 is a schematic drawing showing a first rolling track of the ball screw module according to the present invention.
Figure 6:
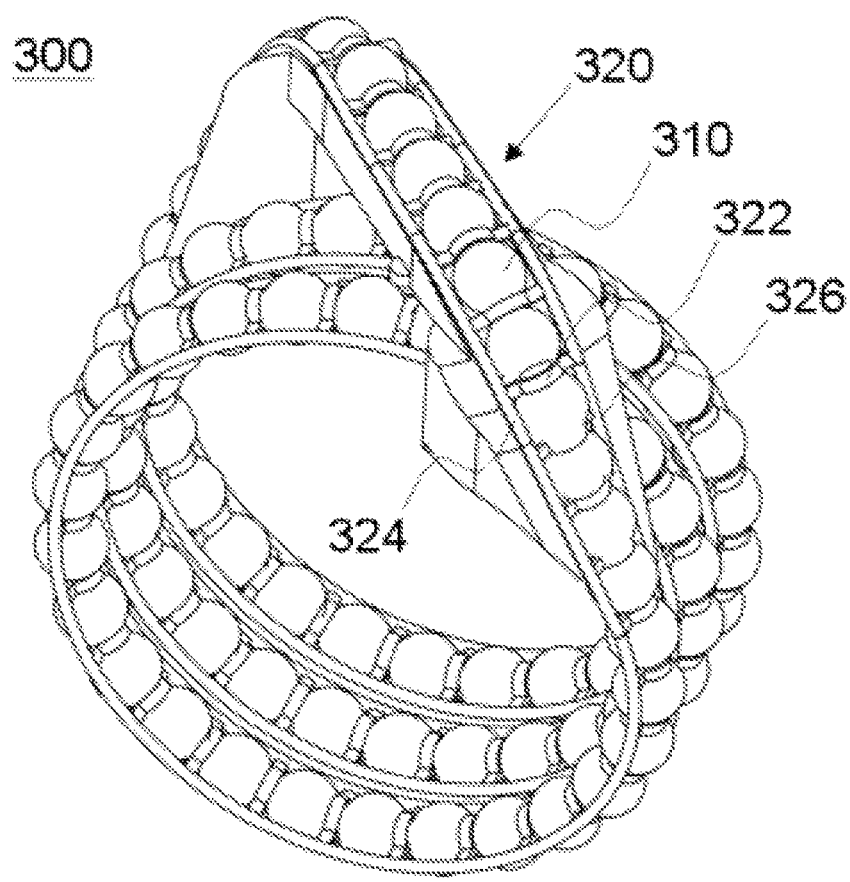
FIG. 6 is a perspective view of the ball connector of the ball screw module according to the present invention.
Figure 7:
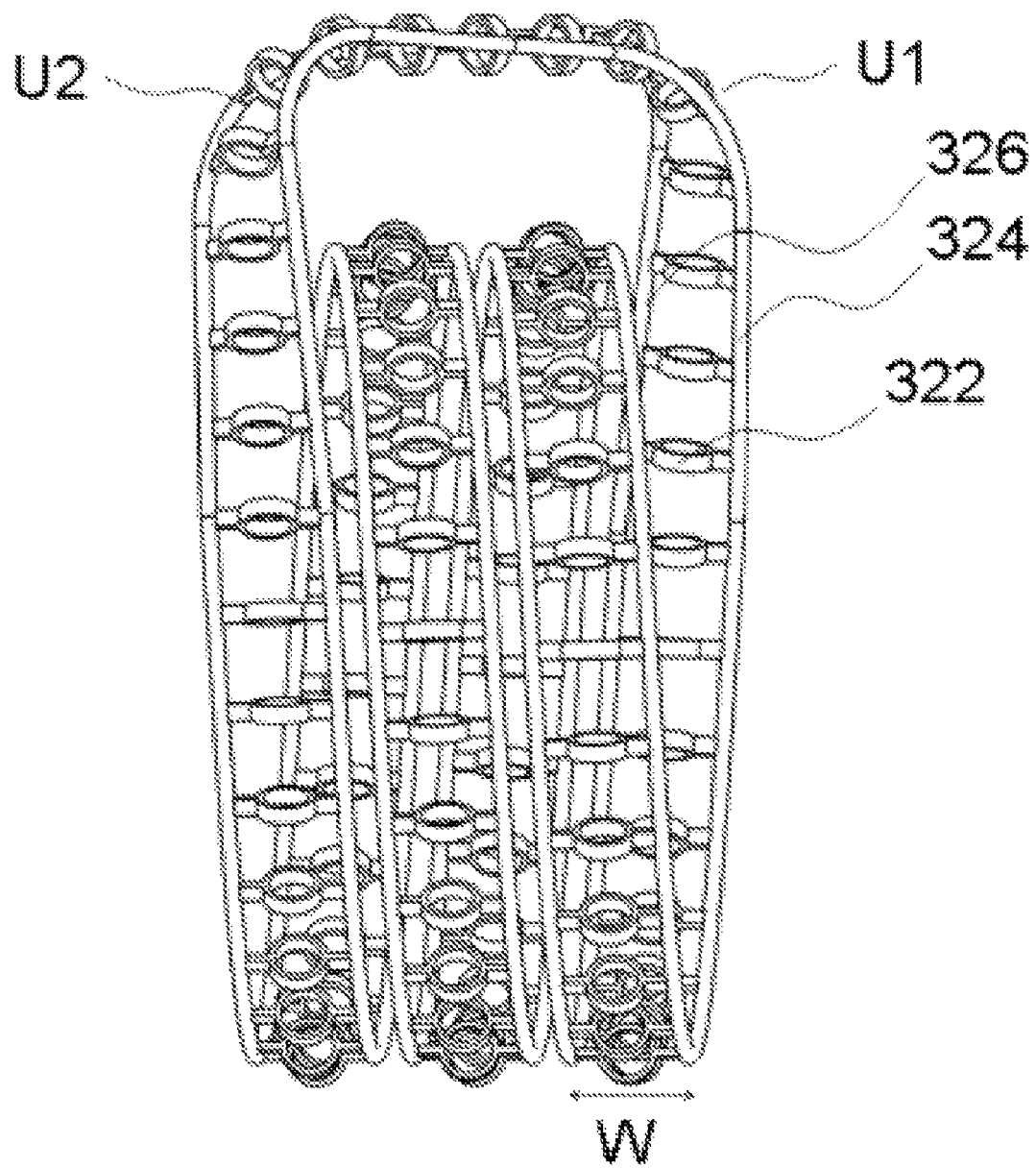
FIG. 7 is a perspective view of a connector of the ball connector of the ball screw module and the direction in which the connector in a circulating route turns along a guiding groove according to the present invention.

The present invention is directed to a ball screw module based on mechanism transmission principles comprehensible to persons ordinarily skilled in the related art, and thus the related mechanism transmission principles are not described in detail hereunder. Also, the accompanying drawings solely serve an illustrative purpose and therefore are not drawn to scale.

Referring to FIGS. 2, 3, 4 and 5, the present invention discloses a first preferred embodiment wherein a ball screw module 200 comprises a screw shaft 210, a nut member 220, a ball connector 300, and a circulating device 400. The screw shaft 210 has an outer surface provided with a spiral-shaped first load rolling groove 212. The nut member 220 is circumferentially disposed around the screw shaft 210 and has an inner surface provided with a spiral-shaped second load rolling groove 222 corresponding in position to the first load rolling groove 212. The first load rolling groove 212 and the second load rolling groove 222 together form a spiral-shaped first rolling track 230. The number of the circulating devices 400 is one or more.

Referring to FIGS. 4, 5, 6 and 7, the ball connector 300 comprises a plurality of balls 310 and a connector 320 for carrying the balls 310. The connector 320 further comprises a plurality of intervals 322, a first linking strap 324, and a second linking strap 326. The intervals 322 are configured to space apart the balls 310. The first linking strap 324 and the second linking strap 326 are configured to connect the intervals 322 in series. The first linking strap 324 and the second linking strap 326 are spaced apart by a distance W. The distance W is substantially equal to the diameter of the balls 310, allowing the balls 310 to be steadily disposed between the intervals 322, the first linking strap 324, and the second linking strap 326. The ball connector 300 moves within the first rolling track 230 in ball screw module 200. To achieve precise transmission, preferably, the cross-sectional radius of the first load rolling groove 212 is substantially equal to the radius W/2 of the balls 310. To protect the first linking strap 324 and the second linking strap 326 of the ball connector 300 in motion against damage, both a first teeth part 214 of the screw shaft 210 and a second teeth part 224 of the nut member 220 have a surface roughness Rmax of less than 25 μm.

Referring to FIGS. 3, 5, 8A, 8B, and 8C, to guide the ball connector 300 to the first rolling track 230, the ball screw module 200 comprises a circulating device 400 provided to the nut member 220 and formed with a circulating route 410 in communication with the first rolling track 230 so as to form a continuous circulating route (endless track). The circulating route 410 includes a first turning section U1 and a second turning section U2 for guiding the ball connector 300 to pass the circulating route 410. The circulating device 400 is further formed with a first guiding groove 412 and a second guiding groove 414. Preferably, the circulating route 410 has a cross-sectional radius substantially equal to the first rolling track 230. The first guiding groove 412 is provided beside the circulating route 410 to enable the first linking strap 324 of the ball connector 300 to pass the first guiding groove 412. The second guiding groove 414 is provided on the other side of the circulating route 410 and opposite the first guiding groove 412 to enable the second linking strap 326 of the ball connector 300 to pass the second guiding groove 414.

To enable the ball connector 300 to pass the first turning section U1 and the second turning section U2 smoothly without being dragged or pushed unduly, the ball connector 300 is guided through a three-dimensional turn as described below.

The center line of the circulating route 410 is characterized by a radius of curvature R, the first guiding groove 412 by a first radius of curvature R1, and the second guiding groove 414 by a second radius of curvature R2. The first radius of curvature R1 of the first guiding groove 412 is greater than the radius of curvature R of the center line of the circulating route 410 and the second radius of curvature R2 of the second guiding groove 414 when the ball connector 300 passes the first turning section U1, where preferably R1$\geq$R+W/2 and R2$\leq$R−W/2. The first radius of curvature R1 of the first guiding groove 412 is smaller than the radius of curvature R of the center line of the circulating route 410 and the second radius of curvature R2 of the second guiding groove 414 when the ball connector 300 passes the second turning section U2, where preferably R1≦R−W/2 and R2≧R+W/2. Hence, the first linking strap 324 and the second linking strap 326 passing the first and second guiding grooves are guided through a three-dimensional turn in response to variation in the first and second radii of curvature R1, R2. More importantly, in the preferred embodiments of the present invention, the center line of the circulating route 410, the first guiding groove 412, and the second guiding groove 414 are equal in length, and thus the first linking strap 324 and the second linking strap 326 of the ball connector 300 are unlikely to be dragged or pushed unduly when passing the circulating route 410 due to changes of radius of curvature.

In the ball screw module, the balls are carried by the connector and spaced apart by a fixed distance so as to prevent the balls in motion from colliding with one another, and in consequence the service life of the balls is prolonged. Also, the first and second guiding grooves in the circulating device are specially designed such that at the first and second turning sections in the circulating device the ball connector is guided through a three-dimensional turn along a specific path with well-designed curvature. Furthermore, the first and second guiding grooves which flank the ball connector are substantially equal in length, and thus the first linking strap and the second linking strap of the ball connector are unlikely to be unduly dragged or pushed when passing the turning sections, thereby allowing the ball connector to move within the ball screw module smoothly and efficiently.

Figure 8A:
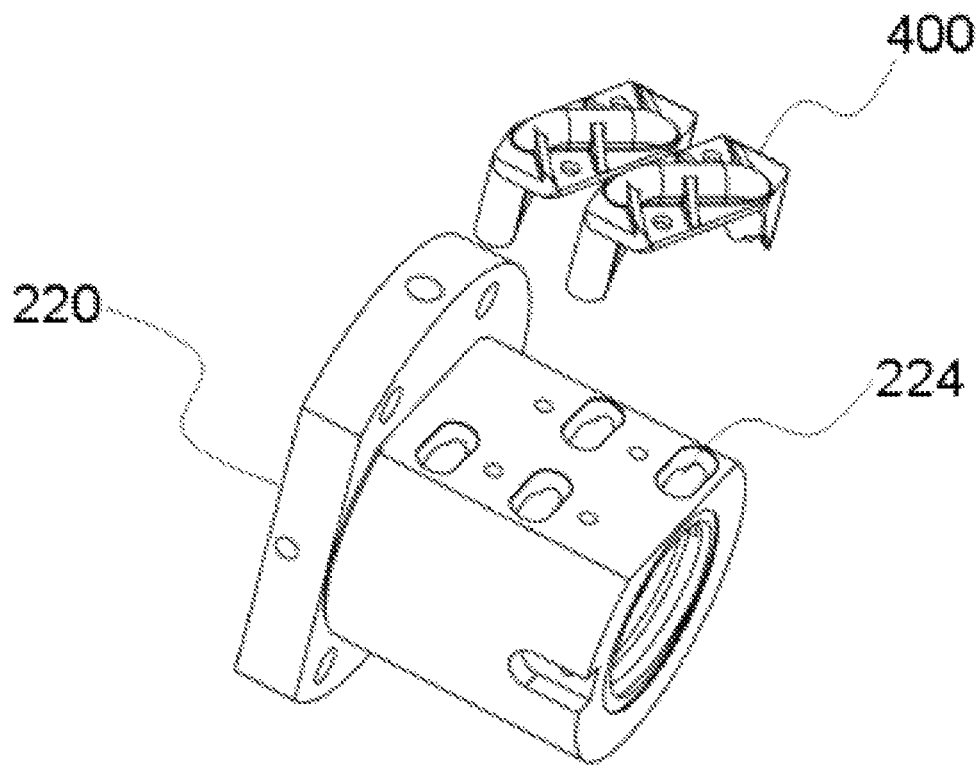
FIG. 8A is a perspective view of the nut member and the circulating device of the ball screw module according to the present invention.
Figure 8B:
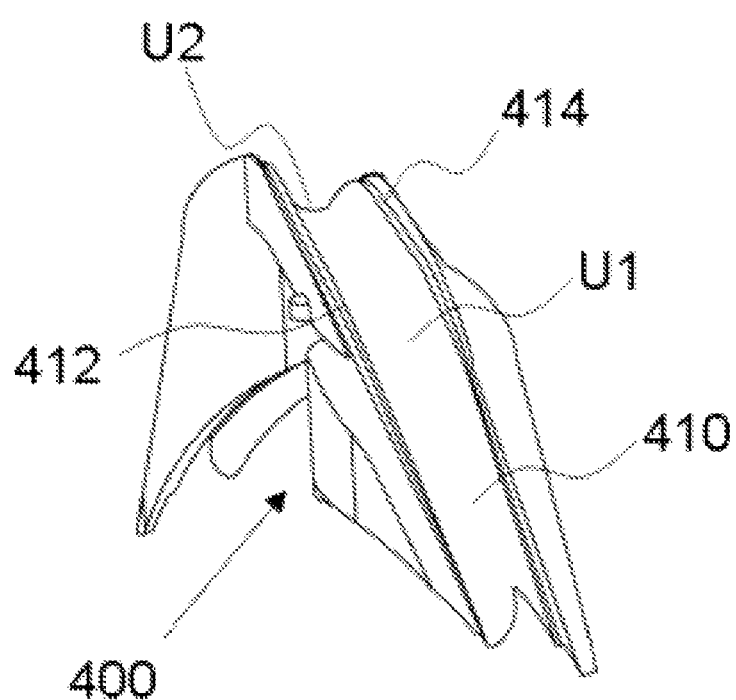
FIG. 8B is a schematic drawing showing the lower half of the circulating device of the ball screw module according to the present invention.
Figure 8C:
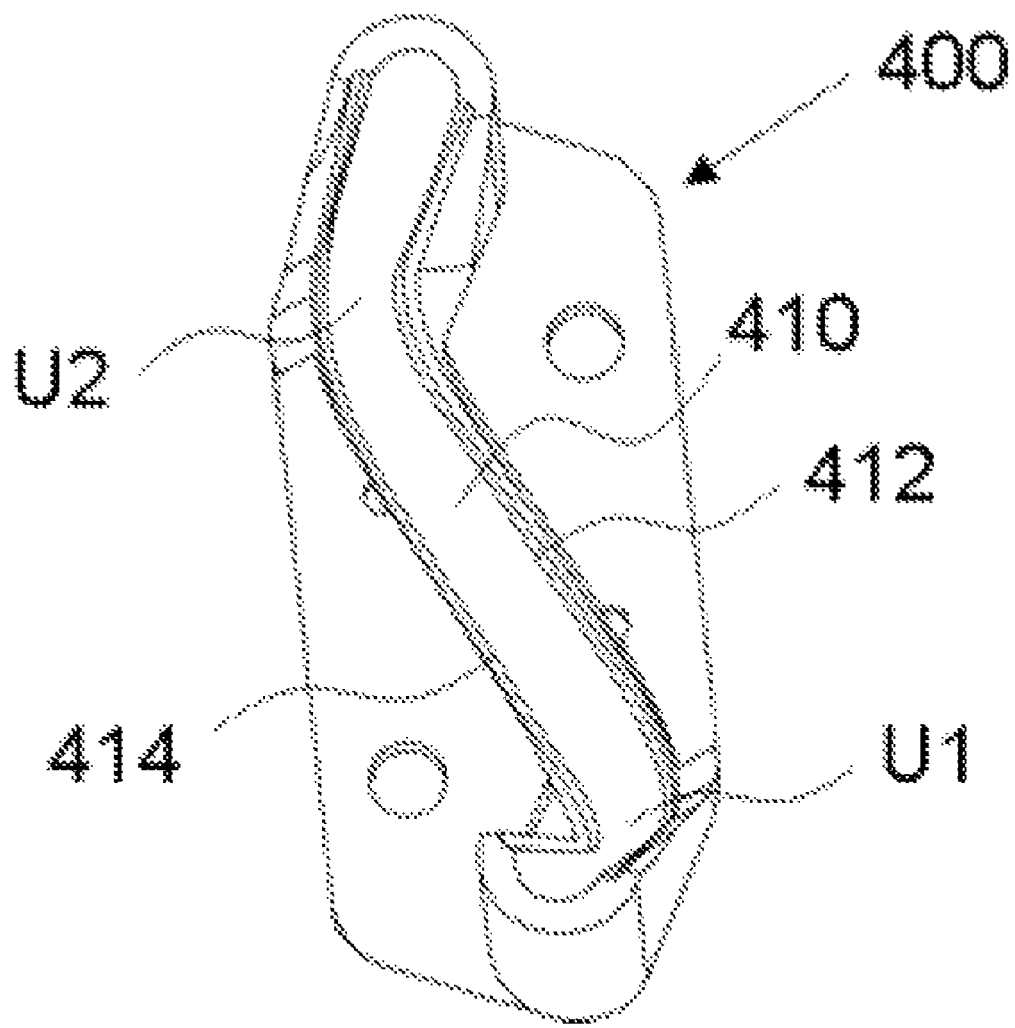
FIG. 8C is a schematic drawing showing the upper half of the circulating device of the ball screw module according to the present invention, taken from an upward perspective view point.

Referring to FIGS. 8A, 8B, and 8C, the present invention further provides a second preferred embodiment wherein the circulating device 400 is configured for use with the nut member 220 of the ball screw module, and more particularly a nut member of the external-circulating ball screw module. The nut member 220 is provided with one, two, or a plurality of circulating devices 400. In the second preferred embodiment, the nut member 220 further comprises a plurality of mounting holes 224 formed to penetrate the nut member, configured to hold the circulating device 400 in position, and configured to fix a portion of the circulating device 400 in position outside the nut member 220. The circulating device 400 has a first turning section U1 and a second turning section U2 which the ball connector 300 passes. The circulating device 400 comprises a circulating route 410, a first guiding groove 412, and a second guiding groove 414. The essential features of the circulating device 400 in the second preferred embodiment are the same as those of the circulating device 400 in the first preferred embodiment.

Figure 9A:
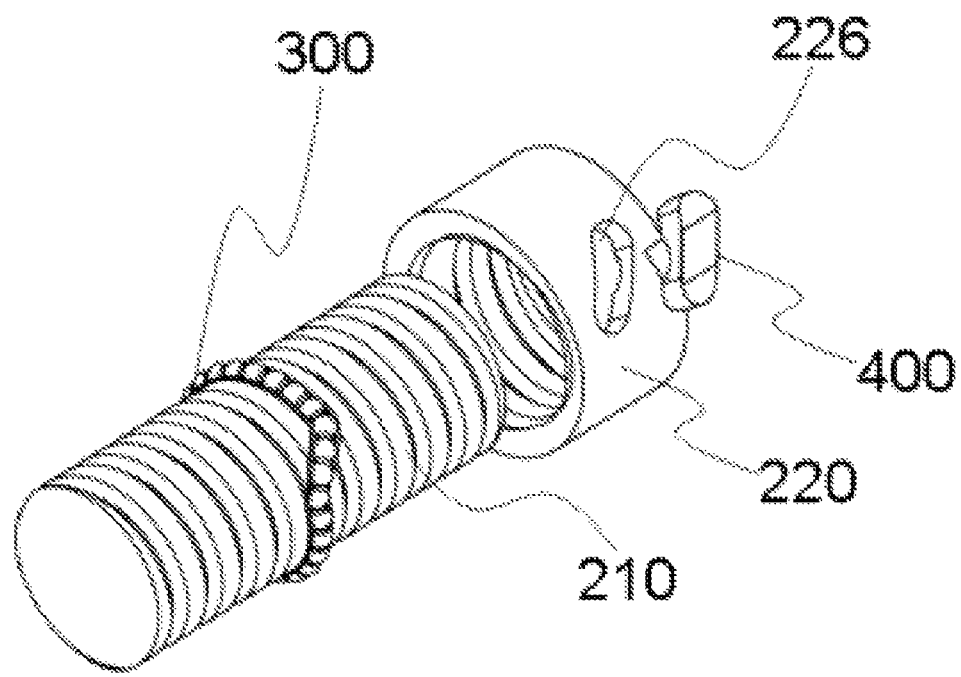
FIG. 9A is an exploded view of the internal-circulating ball screw module according to the present invention.
Figure 9B:
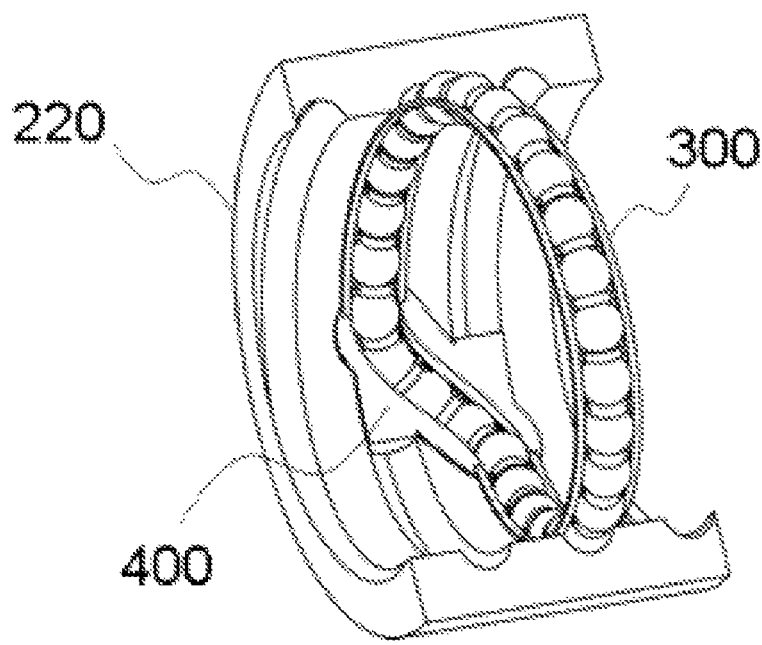
FIG. 9B is a schematic drawing showing the assembly of the ball connector and the circulating device inside the nut member of the internal-circulating ball screw module according to the present invention.

Referring to FIGS. 9A and 9B, the present invention further provides a third preferred embodiment wherein the circulating device 400 is provided inside the nut member 220 of the ball screw module, and more particularly a nut member of the internal-circulating ball screw module. In the third preferred embodiment, the inner surface of the nut member 220 is formed with a first through hole 226 so as for the circulating device 400 to be disposed in the first through hole 226. The essential features of the circulating device 400 in the third preferred embodiment are the same as those of the circulating device 400 in the first preferred embodiment.

Figure 10A:
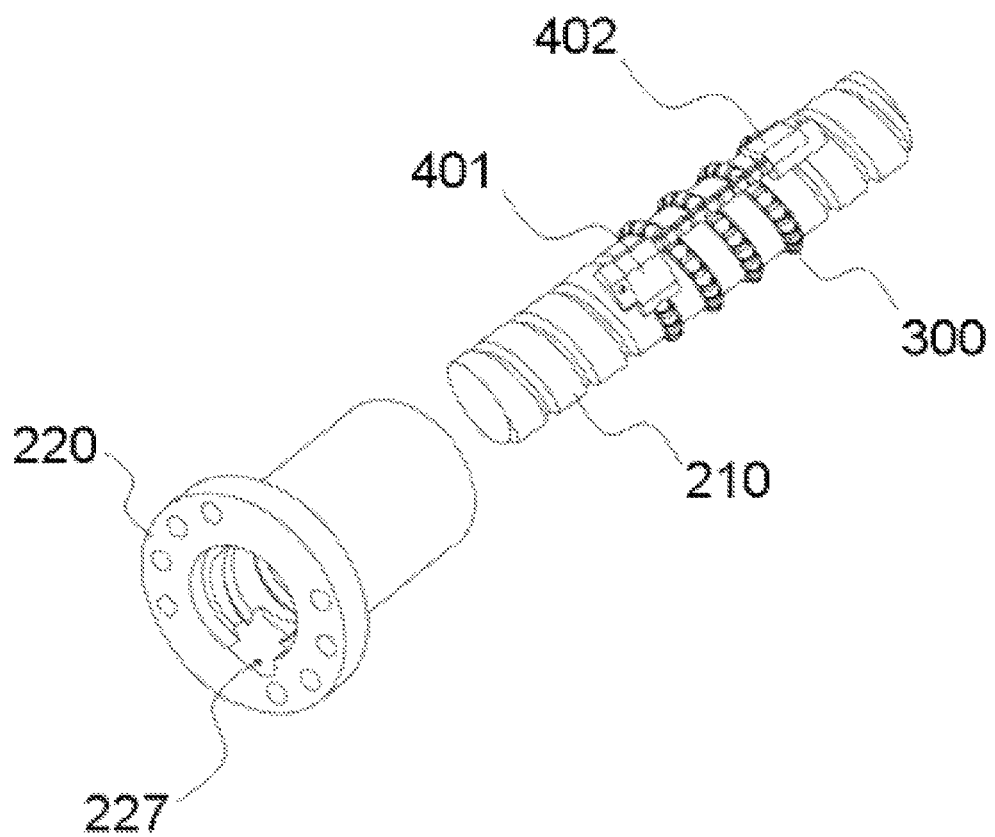
FIG. 10A is an exploded view of the circulating component-style ball screw module according to the present invention.
Figure 10B:
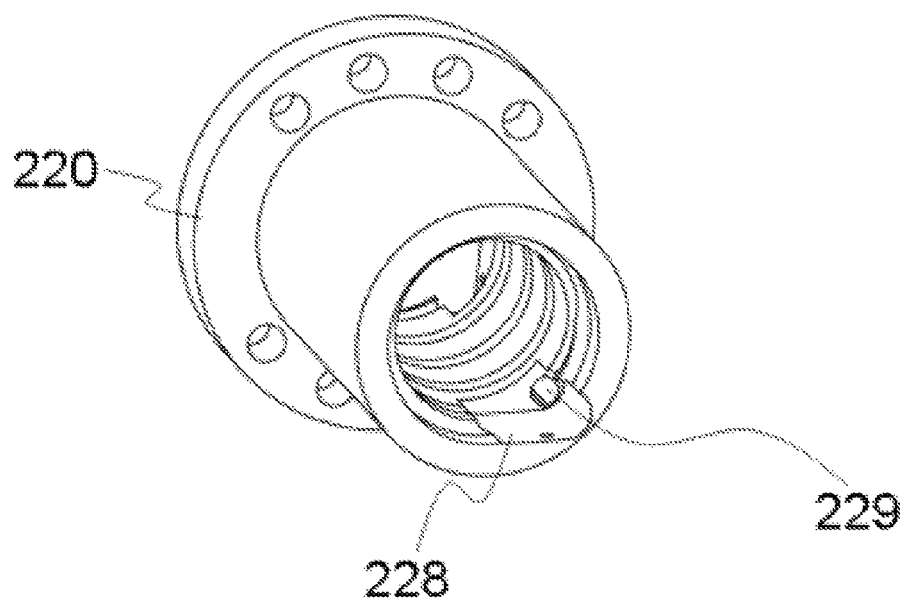
FIG. 10B is a schematic drawing showing the inner structure of the nut member of the circulating component-style ball screw module according to the present invention.

Referring to FIGS. 10A and 10B, the present invention further provides a fourth preferred embodiment wherein the circulating device is disposed in the nut member of the ball screw module, and more particularly, a nut member of the circulating component-style ball screw module. In the fourth preferred embodiment, the nut member 220 is formed with two slots 227, 228 and a second through hole 229. The two slots 227, 228 are provided at the two ends of the inside of the nut member, respectively. The second through hole 229 is in communication with the two slots 227, 228. The circulating device comprises circulating components 401, 402 configured to be disposed in the two slots 227, 228. The first turning section U1 and the second turning section U2 are provided in the circulating components 401, 402, respectively. A portion of the circulating route 410 is provided in the second through hole 229. The essential features of the circulating device in the fourth preferred embodiment are the same as those of the circulating device 400 in the first preferred embodiment.

The foregoing specific embodiments are only illustrative of the features and functions of the present invention but are not intended to restrict the scope of the present invention. It is apparent to those skilled in the art that all equivalent modifications and variations made in the foregoing embodiments according to the spirit and principle in the disclosure of the present invention should fall within the scope of the appended claims.

What is claimed is:

1. A ball screw module, comprises:
   a screw shaft having an outer surface provided with a first load rolling groove;
   a nut member circumferentially disposed around the screw shaft and having an inner surface provided with a second load rolling groove corresponding in position to the first load rolling groove, wherein the first load rolling groove and the second load rolling groove together form a first rolling track;
   a ball connector capable of moving around in the first rolling track and comprising a plurality of balls and a connector for carrying the balls, the connector comprising:
      a plurality of intervals whereby the balls are fixed in position and spaced apart; and
      a first linking strap and a second linking strap for connecting the intervals in series, wherein the first linking strap and second linking strap are spaced apart by a distance; and
   a circulating device provided to the nut member and formed with a circulating route in communication with the first rolling track, so as to enable the ball connector to pass the circulating route, the circulating route having a first turning section and a second turning section;
   wherein the circulating device is characterized in that:
   the circulating route takes a turn at the first turning section and the second turning section in a three-dimensional manner, and the circulating device is formed with a first guiding groove and a second guiding groove for guiding a first linking strap and a second linking strap of the ball connector, wherein the first guiding groove has a radius of curvature greater than a radius of curvature of the second guiding groove when the ball connector passes the first turning section, and the first guiding groove has the radius of curvature smaller than the radius of curvature of the second guiding groove when the ball connector passes the second turning section.

2. The ball screw module of claim 1, wherein the first guiding groove has the radius of curvature greater than a radius of curvature of a center line of the circulating route when the ball connector passes the first turning section, and the first guiding groove has the radius of curvature smaller than the radius of curvature of the center line of the circulating route when the ball connector passes the second turning section.

3. The ball screw module of claim 2, wherein with the distance spacing apart the first linking strap and the second linking strap of the ball connector being denoted by W, the radius of curvature of the center line of the circulating route by R, the radius of curvature of the first guiding groove by R1, the radius of curvature of the second guiding groove by R2, the first turning section features $R1 \geq R+W/2$, and the second turning section features $R1 \leq R-W/2$.

4. The ball screw module of claim 3, wherein the first turning section features $R2 \leq R-W/2$, and the second turning section features $R2 \geq R+W/2$.

5. The ball screw module of claim 4, wherein the first guiding groove and the second guiding groove are equal in length.

6. The ball screw module of claim 5, wherein the center line of the circulating route, the first guiding groove, and the second guiding groove are equal in length.

7. The ball screw module of claim 1, wherein the screw shaft further comprises a first teeth part with a surface roughness of less than 25 μm.

8. The ball screw module of claim 1, wherein the nut member further comprises a second teeth part with a surface roughness of less than 25 μm.

9. The ball screw module of claim 1, wherein the first load rolling groove has a cross-sectional radius substantially equal to radii of the balls.

10. The ball screw module of claim 1, wherein the first rolling track has a cross-sectional radius substantially equal to a cross-sectional radius of the circulating route.

11. The ball screw module of claim 1, wherein the nut member further comprises a plurality of mounting holes formed to penetrate the nut member, configured to hold the circulating device in position, and configured to fix a portion of the circulating device in position outside the nut member.

12. The ball screw module of claim 1, wherein the inner surface of the nut member further comprises a first through hole so as for the circulating device to be disposed in the first through hole.

13. The ball screw module of claim 1, wherein the nut member further comprises:
   two slots provided at two ends of an inside of the nut member; and
   a second through hole in communication with the two slots.

14. The ball screw module of claim 13, wherein the circulating device further comprises two circulating components configured to be disposed in the two slots.

15. The ball screw module of claim 14, wherein the first turning section and the second turning section are provided in the two circulating components, respectively.

* * * * *